(12) United States Patent
Rajagopalan et al.

(10) Patent No.: US 11,598,301 B2
(45) Date of Patent: Mar. 7, 2023

(54) FASTENER ASSEMBLY

(71) Applicant: J.C. BAMFORD EXCAVATORS LIMITED, Uttoxeter (GB)

(72) Inventors: Ananthan Rajagopalan, Uttoxeter (GB); Mohammad Saifullah Khan, Uttoxeter (GB); Swapnali Shete, Uttoxeter (GB); Ashley White, Uttoxeter (GB); Sanjeev Arora, Faridabad (IN)

(73) Assignee: J.C. BAMFORD EXCAVATORS LIMITED, Uttoxeter (GB)

(*) Notice: Subject to any disclaimer, the term of this patent is extended or adjusted under 35 U.S.C. 154(b) by 24 days.

(21) Appl. No.: 17/083,249

(22) Filed: Oct. 28, 2020

(65) Prior Publication Data

US 2021/0123402 A1   Apr. 29, 2021

(51) Int. Cl.
| | |
|---|---|
| *F02M 55/02* | (2006.01) |
| *F02M 55/00* | (2006.01) |
| *F02M 61/14* | (2006.01) |
| *F16L 21/03* | (2006.01) |
| *F16L 58/18* | (2006.01) |

(52) U.S. Cl.
CPC ........ *F02M 55/025* (2013.01); *F02M 55/005* (2013.01); *F02M 61/14* (2013.01); *F16L 21/03* (2013.01); *F16L 58/185* (2013.01); *F02M 2200/856* (2013.01); *F02M 2200/857* (2013.01)

(58) Field of Classification Search
CPC .... F02M 55/025; F02M 61/14; F02M 55/005; F02M 2200/856; F02M 2200/857; F02M 55/00; F02M 55/02; F02M 2200/16; F02M 55/01; F16L 21/03; F16L 58/185

USPC ........................................................ 123/456
See application file for complete search history.

(56) References Cited

U.S. PATENT DOCUMENTS

| | | | | |
|---|---|---|---|---|
| 5,350,090 A | * | 9/1994 | McClure | B67D 1/0456 222/402.25 |
| 5,957,507 A | | 9/1999 | Asada | |
| 2011/0084476 A1 | * | 4/2011 | Nishida | F16L 55/179 285/45 |
| 2011/0315122 A1 | | 12/2011 | Straub | |

(Continued)

FOREIGN PATENT DOCUMENTS

| | | |
|---|---|---|
| EP | 1491759 A1 | 12/2004 |
| EP | 2261497 A1 | 12/2010 |

(Continued)

OTHER PUBLICATIONS

Search Report for GB Patent Application No. 1918527.1, dated May 22, 2020.

(Continued)

*Primary Examiner* — Yi-Kai Wang
(74) *Attorney, Agent, or Firm* — Marshall, Gerstein & Borun LLP

(57) ABSTRACT

A fastener assembly for connecting a fuel pipe to an engine component. The fastener assembly includes a housing and a fastener positioned within the housing. The housing has an end surface with an aperture for receiving a fuel pipe therethrough. At least one side wall extends from the end surface to define a recess for receiving a fastener therein. The fastener has a pipe inlet for receiving a fuel pipe therethrough, and a connecting arrangement for connecting the fastener to an engine component.

16 Claims, 4 Drawing Sheets

(56) References Cited

U.S. PATENT DOCUMENTS

2019/0120192 A1* 4/2019 Naganawa .............. F02B 61/06
2020/0370687 A1* 11/2020 Taylor .................... F16L 21/08

FOREIGN PATENT DOCUMENTS

JP         H10169528 A    6/1998
JP            3768043 B2    4/2006
WO    WO-2015/189670 A1   12/2015

OTHER PUBLICATIONS

Extended European Search Report for Application No. 20204169, dated Feb. 24, 2021.

* cited by examiner

FASTENER ASSEMBLY

FIELD OF THE INVENTION

The present invention relates to a fastener assembly for a fuel connection interface, an engine assembly including a fastener assembly, and a working machine including an engine assembly.

BACKGROUND OF THE INVENTION

In known engine systems, such as those used in working machines like excavators, tractors, backhoe loaders, loading shovels, telehandlers etc., fuel injectors are used to introduce or inject fuel into an internal combustion engine. Following a request by an operator, an engine control unit signals to a fuel injector in order to spray the pressurized fuel into the engine to be combusted. In such systems, a fuel injector may introduce fuel directly into a cylinder of the engine, or one or more injectors may introduce fuel into a throttle body.

The engine system will include fuel lines to connect the fuel tank to the fuel injectors, and a fastener will be used to secure the fuel line to the fuel injector. Through continued use of the machine, or through long periods of time in storage, dust can build up on the connection interfaces between the fuel line and the different components of the engine (e.g. the fuel injectors). This build-up of dust can result in dust and debris entering the fuel injectors, which can cause failure of the fuel injectors and of the engine as a whole.

The present invention seeks to overcome or at least mitigate one or more problems associated with the prior art.

SUMMARY OF THE INVENTION

A first aspect of the invention provides a fastener assembly for connecting a fuel pipe to an engine component, the fastener assembly comprising:

a housing comprising an end surface having an aperture for receiving a fuel pipe therethrough, in use, and at least one side wall extending from the end surface, wherein a distal end of the at least one side wall defines an open end of the housing and wherein the end surface and the at least one side wall define a recess for receiving a fastener therein; and a fastener positioned within the housing, the fastener comprising a pipe inlet for receiving a fuel pipe therethrough, in use, and a connecting arrangement for connecting the fastener to an engine component.

The housing is configured to sealingly engage an outer surface of a fuel pipe extending therethrough, in use.

In this arrangement the housing substantially covers a connection interface between an engine component and the fastener. The housing forms a seal against the fuel pipe, which reduces the amount of dust/debris that is able to enter the housing. This, in turn, reduces build-up of dust/debris on the connection interfaces between the engine component and the fastener, which helps to reduce the chance of dust/debris entering the engine component, e.g. a fuel injector.

In exemplary embodiments, the housing comprises a first seal member configured to seal the aperture against an external surface of a fuel pipe extending therethrough, in use.

Providing a seal between the aperture and the pipe, e.g. providing a seal member extending around a radially inner surface of the aperture, helps to reduce the amount of dust that is able to enter the housing via the housing aperture. This reduces the amount of dust that is able to come into contact with the connection interface between the fastener and the engine component.

In exemplary embodiments, the first seal member is resiliently deformable.

This has been found to improve the seal formed between the housing and an external surface of a fuel pipe.

In exemplary embodiments, the first seal member comprises a rib extending radially inwardly from the housing, and wherein, in use, the rib is configured and arranged to be deflected in a direction towards the open end of the housing upon movement of a fuel pipe in a direction towards the open end of the housing and to be deflected in a direction away from the open end of the housing upon movement of a fuel pipe in a direction away from the open end of the housing.

When the pipe moved in a direction away from the open end of the housing (i.e. in a direction extending from the open end towards the end surface), the first seal member moves or flicks in a direction away from the fastener. This helps to direct any dust collected on the first seal member away from the fastener. This, in turn, helps to reduce the likelihood of dust falling onto the connection interface upon removal of fuel pipe, e.g. during maintenance.

In exemplary embodiments, the housing is configured to form a second seal surface with an external surface of a fuel pipe, in use.

This provides a second seal for preventing the ingress of duct into the connection interface. Thus, this arrangement further reduces the likelihood of dust falling onto the connection interface.

In exemplary embodiments, the housing comprises a radially inwardly extending second seal member angled in a direction away from the open end of the housing, and wherein a radially inner surface of the second seal member is configured for forming the second seal surface, in use.

When inserting the pipe, the second seal member is deformed which improves the seal with the pipe. Additionally, the angled arms work to direct dust away from the external surface of the fuel pipe.

In exemplary embodiments, the housing comprises one or more projections on an internal face of the end surface configured to urge the second seal member into engagement with the fuel pipe, in use.

This improves the seal created between the support member and the fuel pipe.

In exemplary embodiments, the fastener assembly further comprises a reinforcing member interposed between the fastener and the second seal member.

The reinforcing member provides support to the second seal member. The provision of the reinforcing member helps to prevent the second seal member being deformed too much during insertion of a fuel pipe, which may be detrimental to the seal formed between the support member and the fuel pipe.

In exemplary embodiments, the fastener assembly defines an internal cavity, e.g. an annular cavity, for receiving dust therein.

This provides a space such that, even if dust does get into the fastener assembly, at least some of the dust will be directed into the cavity, thus reducing the likelihood of dust falling onto the connection interface.

In exemplary embodiments, the internal cavity comprises an inlet positioned between the first and second seal surfaces.

This arrangement provides a path of least resistance for the dust into the cavity, which helps to further reduce dust falling onto the connection surface.

In exemplary embodiments, the fastener assembly further comprises a support member positioned in the housing recess for supporting the fastener within the housing.

In exemplary embodiments, the support member is configured for forming the second seal surface.

In exemplary embodiments, the support member comprises a radially inner surface configured to conform to a radially outer surface of the fastener.

In exemplary embodiments, the support member is separate from the housing and is retained within the housing, e.g. via an interference fit or frictional mount.

This allows the housing and the support member to be manufactured from different materials, e.g. a rigid housing for strengthening the assembly, and a resilient support member for engaging the fastener.

In exemplary embodiments, the support member is formed from a resiliently deformable material, e.g. rubber.

In exemplary embodiments, the support member comprises a radially outer surface configured to conform to a radially inner surface of the housing.

In exemplary embodiments, the housing is configured to retain the fastener therein.

This enables the housing and fastener to be supplied as a pre-formed assembly.

In exemplary embodiments, the housing comprises a plurality of retaining arms extending from the distal end of the at least one side wall for engaging the fastener to retain the fastener within the housing.

In exemplary embodiments, the one or more retaining arms each comprise a projection extending radially inward therefrom to substantially oppose the end surface.

This arrangement enables the retaining arms to hook onto the fastener to hold the fastener between the arms and the end surface.

In exemplary embodiments, the housing is formed from a rigid material, e.g. a rigid plastics material.

In exemplary embodiments, the at least one side wall is substantially circular, square, hexagonal or any other polygonal shape in cross-section.

In exemplary embodiments, a fuel pipe extends through the housing aperture and the pipe inlet.

A second aspect of the invention provides a method of assembling a fuel pipe and a fastener assembly of the first aspect of the invention, the method comprising,
    positioning a portion of a partially-assembled fuel pipe within the aperture of the housing;
    positioning a portion of the partially-assembled fuel pipe within the pipe inlet of the fastener;
    positioning the fastener within the housing; and
    adding an end component to the partially-assembled fuel pipe to form a fully-assembled fuel pipe and fastener assembly.

By adding the end component to the fuel pipe after it has been positioned within the aperture and pipe inlet of the fastener assembly, the end component does not have to pass through the aperture or pipe inlet. This is particularly beneficial for embodiments where the end component has a greater radius than the rest of the fuel pipe, since it allows a tight fit between the aperture and/or pipe inlet to be formed.

A third aspect of the invention provides an engine assembly for a vehicle, the engine assembly comprising:
    an engine component;
    a fuel pipe for delivering fuel to or from the engine component; and
    a fastener assembly according to the first aspect of the invention.

The fuel pipe extends through the housing aperture and the pipe inlet and is secured to the engine component by the fastener at a connection interface.

In exemplary embodiments, the engine component is a fuel injector or a fuel rail for connection to one or more fuel injectors.

A fourth aspect of the invention provides a working machine comprising:
    a body;
    a working arm connected to the body; and
    an engine assembly according to the third aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
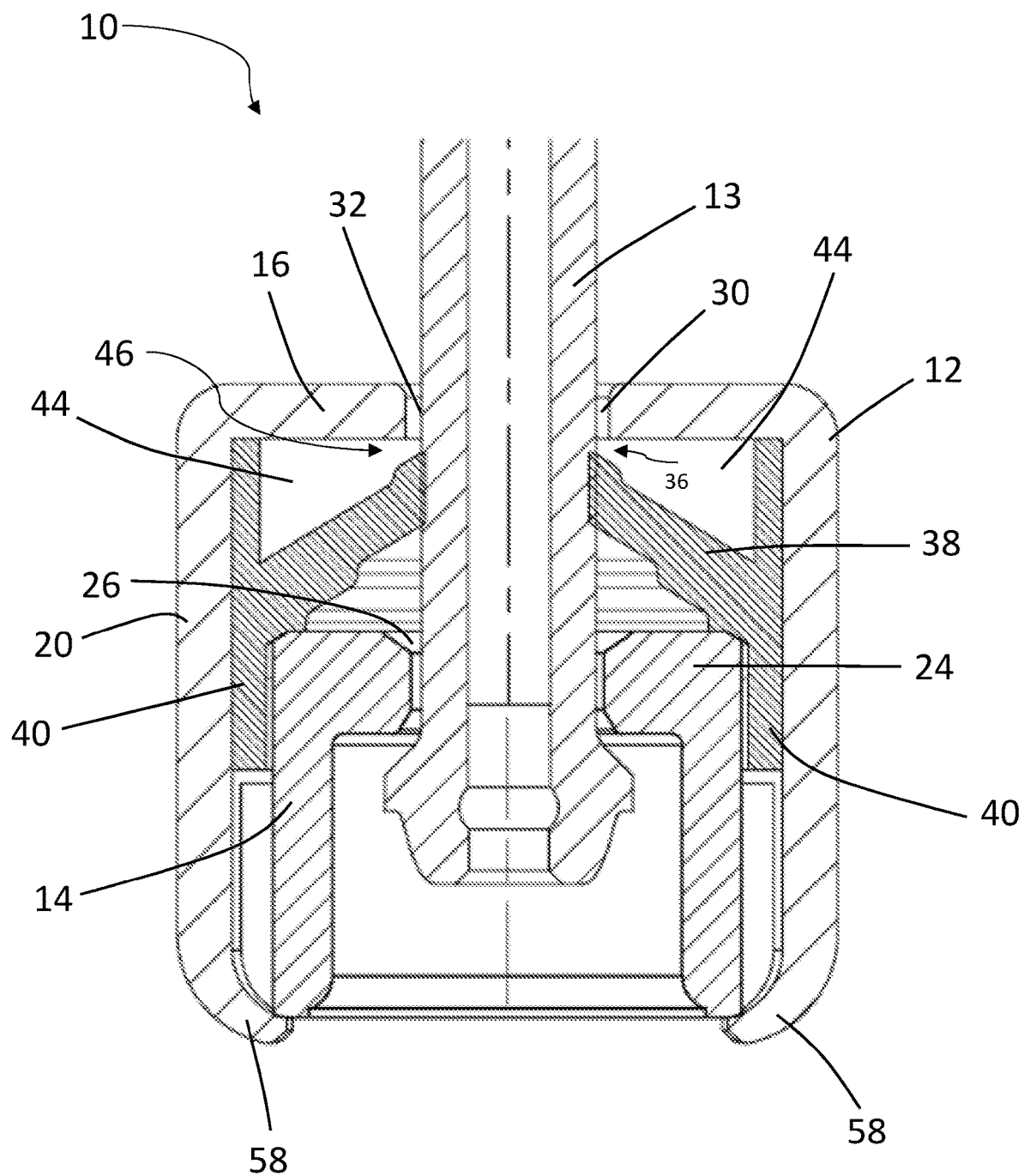
FIG. 1 is a cross-sectional side view of a fastener assembly according to an embodiment.
Figure 2:
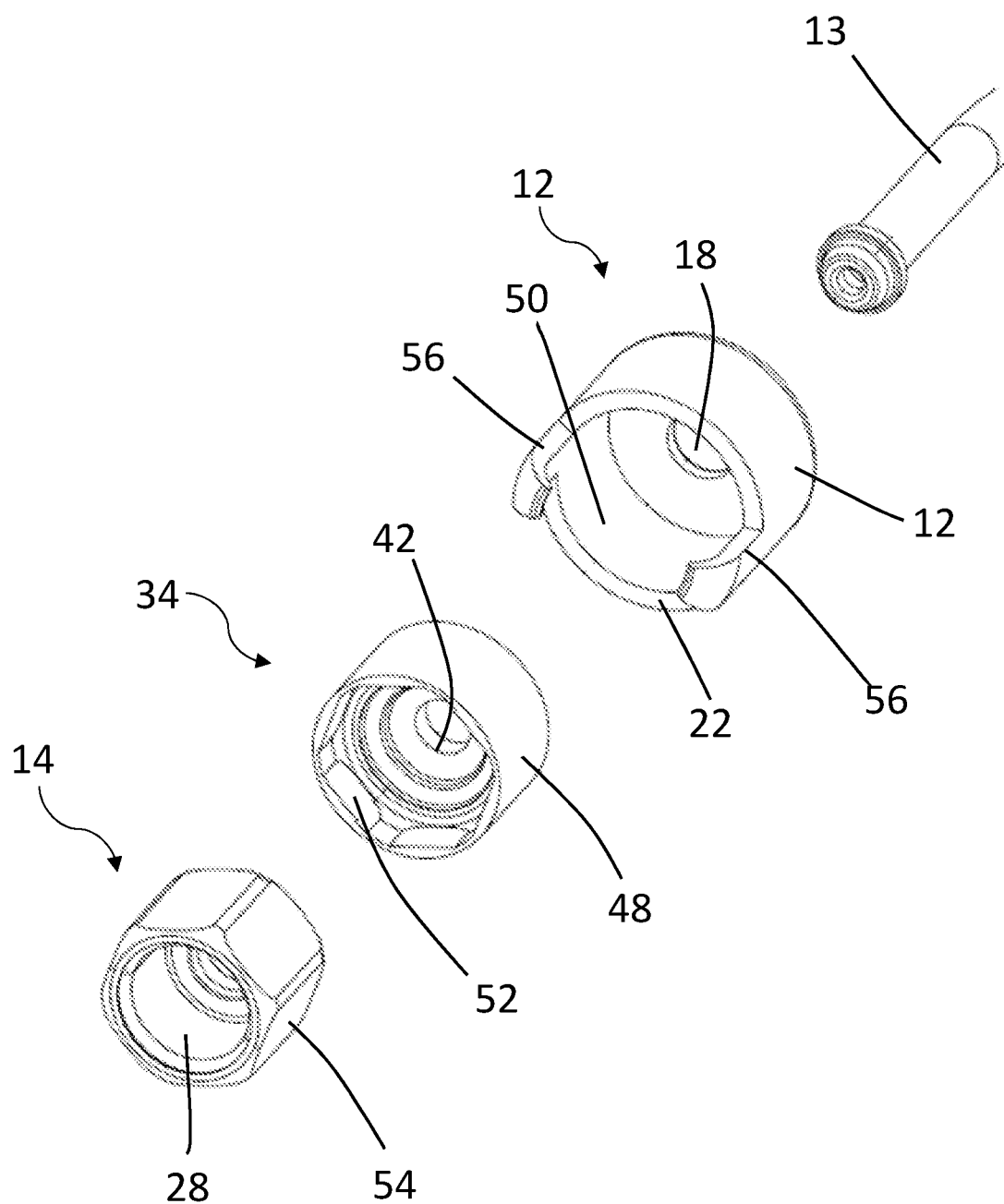
FIG. 2 is an exploded isometric view of the fastener assembly of FIG. 1.

Referring firstly to FIGS. 1 and 2, a fastener assembly for connecting a fuel pipe to an engine component is illustrated and indicated generally at 10.

The fastener assembly 10 includes a housing 12 and a fastener 14 positioned within the housing 12. The housing 12 includes an end surface 16 having an aperture 18 therein for receiving a fuel pipe 13 therethrough. In the embodiment, the housing 12 is formed from a rigid material, e.g. a rigid plastics material, but it will be appreciated that suitable material may be used such as metal, or rubber etc.

The housing 12 also includes a side wall 20 extending from the end surface 16. In the illustrated arrangement, the side wall 20 is substantially cylindrical (i.e. having a substantially circular cross-section) and so the housing 12 only includes a single side wall. In alternative arrangements, the housing may include more than one side wall and the side walls may define a cross-section that is square, hexagonal or any other polygonal shape. The end surface 16 and the side wall(s) 20 define a recess (e.g. an internal volume) of the housing 12 for receiving a fastener therein. A distal end 22 of the side wall 20 defines an open end of the housing 12.

The fastener 14 includes a body 24 having a pipe inlet 26 extending therethrough for receiving the fuel pipe 13. The fastener also includes a connecting arrangement 28 for connecting the fastener 14 to an engine component (not shown). In the illustrated embodiment the connecting arrangement 28 is provided in the form of an internal thread on the body 24.

The housing 12 is configured to sealingly engage an outer surface of the fuel pipe 13 extending through the aperture 18 and the pipe inlet 26. This sealing engagement allows the housing 12 to substantially cover the fastener 14 and the connection interface between the fuel pipe 13 and the fastener 14 in order to protect the interface from the ingress of dust.

The housing 12 includes a first seal member 30 for forming a seal between the housing 12 and the pipe 13 (i.e. an external surface of the pipe 13). Put another way, the first seal member 30 is configured to form a first seal surface 32 between the housing 12 and an external surface of the fuel pipe 13. In the illustrated arrangement, the housing aperture 18 includes a first seal member 30 extending therearound. Forming a seal surface 32 around the aperture 18 helps to prevent dust from entering into the housing 12.

The first seal member 30 is formed from a material that is resiliently deformable, such as rubber. Providing a resiliently deformable seal member has been found to improve the seal between the housing 12 and the pipe 13. The first seal member 30 is provided as a protrusion, e.g. a projecting rib, extending from the housing 12. In the illustrated arrangement, the projecting rib 30 projects radially inwardly from the housing 12, e.g. it projects radially inwardly from a radially inward surface of the aperture 18.

The first seal member 30 is configured and arranged to be deflected in a direction towards the free end 22 of the housing 12, upon movement of the pipe in a direction extending from the end surface 16 towards the distal end 22 of the at least one side wall 20. The first seal member 30 is configured and arranged to be deflected in a direction away from the free end 22 of the housing 12, upon movement of the pipe 13 in a direction extending from the distal end 22 of the at least one side wall 20 towards the end surface 16. In this way, as the pipe 13 is moved away from the free end 22 of the housing 12, the first seal member 30 directs any collected dust away from the housing 12.

The fastener assembly 10 includes a support member 34 interposed between the housing 12 and the fastener 14 for supporting the fastener 14 within the housing 12. The support member 34 is configured to form a second seal surface 36 with the pipe 13. This provides the fastener assembly with a second seal, which further reduces the likelihood of dust falling onto the connection interface.

The support member 34 includes a second seal member 38 for engaging the pipe 13. The second seal member 38 extends radially inwardly from a side wall 40 of the support member 34. A radially inner surface 42 of the second seal member 38 forms the second seal surface 36.

The second seal member 38 extends from the side wall 40 so as to be angled away from the free end 22 of the housing 12. This angled arrangement works to direct dust away from the pipe 13.

When the pipe 13 moves in a direction towards the free end 22 of the housing 12, the second seal member 38 engages the pipe 13 and is deformed in a direction towards said free end 22 of the housing 12. Similarly, as the pipe 13 is moved in a direction away from free end 22 of the housing 12, the second seal member 38 moves in a direction away from the free end 22 of the housing 12, which helps to direct dust away from the pipe 13.

The housing 12 and the support member 34 are arranged to define an internal cavity 44 for receiving dust and debris therein. In the illustrated arrangement, the cavity 44 is provided as annular cavity. The inlet 46 to the cavity 44 is positioned between the first and second seal surfaces 32, 36. This arrangement provides a path of least resistance into the cavity for the dust/debris within the fastener assembly 10, which helps to further reduce dust falling onto the connection surface.

The support member 34 has a radially outer surface 48 which conforms to a radially inner surface 50 of the housing 12. In the arrangement shown, the radially outer surface 48 of the support member 34 and the radially inner surface 50 of the housing 12 are both cylindrical. In alternative arrangements, the radially outer surface 48 of the support member 34 and the radially inner surface 50 of the housing 12 may be any suitable alternative shape, e.g. in order to inhibit relative rotational movement between the support member 34 and the housing 12.

The support member 34 has a radially inner surface 52 which engages the fastener 14. The radially inner surface 52 conforms to a radially outer surface 54 of the fastener 14. In the arrangement shown, both the radially inner surface 52 of the support member 34 and the radially outer surface 54 of the fastener 14 are hexagonal in cross-section. This arrangement prevents relative rotational movement between the fastener 14 and the support member 34. It will be appreciated that the radially inner surface 52 of the support member 34 and the radially outer surface 54 of the fastener 14 may be any suitable shape that is capable of inhibiting relative rotational movement therebetween.

In the arrangement shown, the support member 34 is provided as separate from the housing 12. The support member 34 is retained within the housing 12 via an interference fit or frictional mount. This allows the housing and the support member to be manufactured from different materials. For example, this allows the housing 12 to be formed from a rigid material (as discussed above) with the support member 34 being formed, for example, from a resiliently deformable material, e.g. rubber. It will be appreciated that in some arrangements, the housing 12 and the support member 34 may be provided as a unitary component.

The housing 12 is configured to retain the fastener 14 within the fastener assembly 10 (i.e. within the housing 12). In order to retain the fastener 14, the housing 12 includes retaining arms 56 extending from the distal end 22 of the at least one side wall 20. The retaining arms 56 engage the fastener 14 to retain the fastener 14 within the housing 12. In the embodiment, two retaining arms 56 are provided, but it will be appreciated that any suitable number of arms 56 may be provided. Each arm 56 includes a projection 58 extending radially inward therefrom to substantially oppose the end surface 16. This inwardly extending projection 58 acts as a hook to hold the fastener 14 between the projection 58 and the end surface 16.

Figure 3:
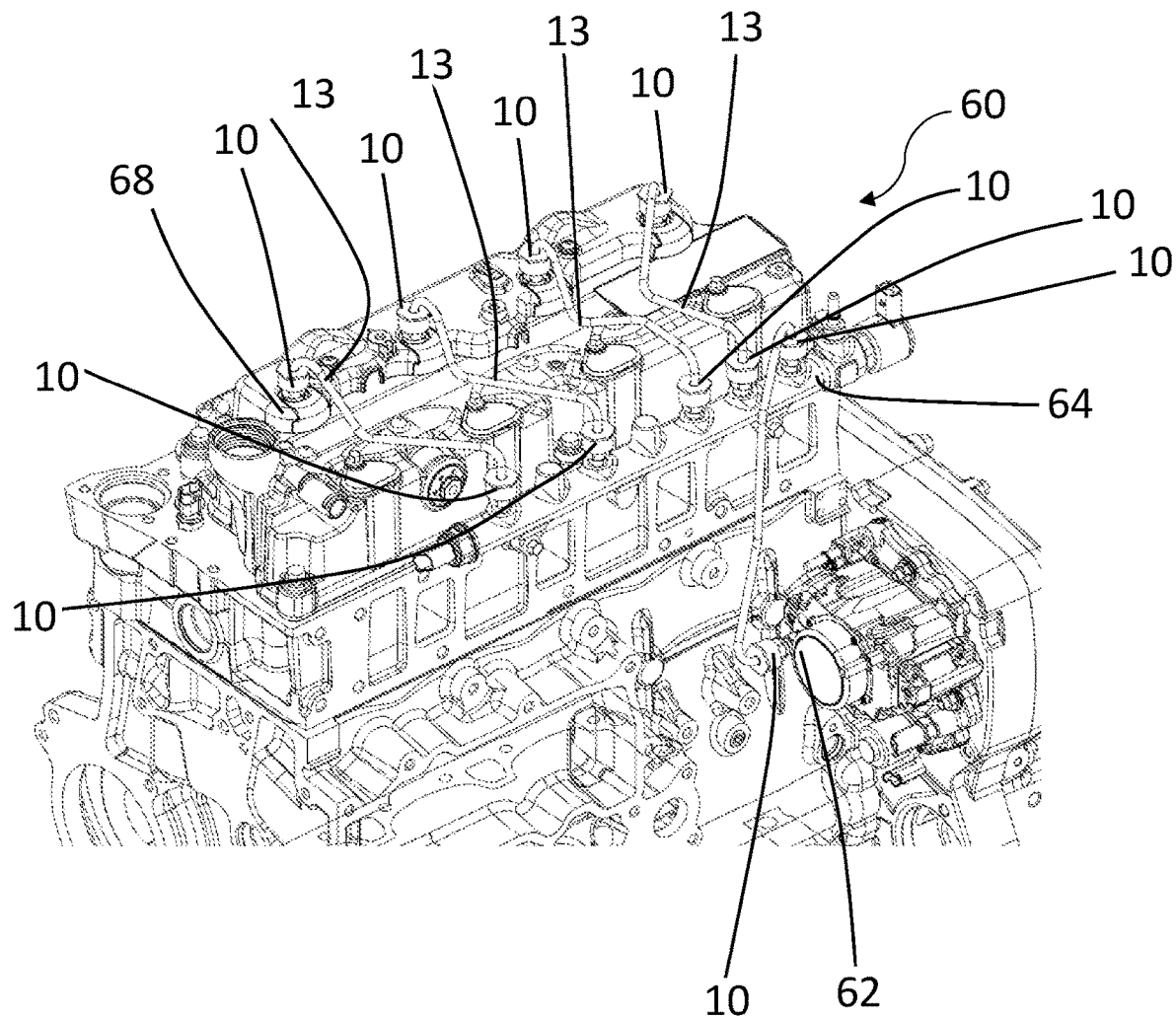
FIG. 3 is an isometric view of an engine assembly according to an embodiment.

Referring now to FIG. 3, an engine assembly 60 for a vehicle, such as a working machine is illustrated.

The engine assembly 60 includes a first engine component 62 in the form of a fuel source 62. A fuel pipe 13 is connected to the first engine component 62 at a connection interface via a fastener assembly 10, as described with reference to FIGS. 1 and 2.

The fuel pipe 13 delivers fuel from the first engine component 62 to a second engine component 64. In the arrangement shown, the second engine component 64 is a fuel rail. The fuel pipe 13 is connected to the second engine component 64 at a connection interface via a fastener assembly 10, as described with reference to FIGS. 1 and 2.

The second engine component 64 (i.e. the fuel rail) includes at least four outlets, and a pipe 13 extends from each outlet 66 to a respective inlet of a third engine component 68 in the form of a fuel injector. In the arrangement shown, the engine includes four fuel injectors 68, but any suitable number may be used. A fastener assembly 10 is provided to secure each fuel pipe 13 to the fuel rail 64 at respective connection interfaces. A fastener assembly 10 is also provided to secure each fuel pipe 13 to the respective fuel injector 68 at a connection interfaces.

In alternative arrangements, it will be appreciated that the engine assembly 60 may not include a fuel rail 64, and a plurality of pipes 13 may be connected between the first engine component (i.e. the fuel source) 62 and each of the fuel injectors 68.

Referring again to FIG. 2, the fastener assembly 10 may be assembled during manufacturing of the fuel pipe 13, as described in detail below. This may improve the connection and sealing properties of the fastener assembly 10.

For example, a first step of assembling a fuel pipe 13 and fastener assembly 10 may be to position a portion of a partially-assembled fuel pipe 13 within the aperture 18 of the housing 12. Following this, a second step may be to position a portion of the partially-assembled fuel pipe 13 within the pipe inlet 26 of the fastener 14. A third step may be to position the fastener 14 within the housing 12. A final step may be to add an end component 76 to the partially-assembled fuel pipe 13 to form a fully-assembled fuel pipe 13 and fastener assembly 10.

By adding the end component 76 to the fuel pipe 13 after it has been positioned within the aperture 18 and pipe inlet 26 of the fastener assembly, the end component 76 does not have to pass through the aperture 18 or pipe inlet 26. This is particularly beneficial for embodiments where the end component 76 has a greater radius than the rest of the fuel pipe 13, since it allows a tight fit between the aperture 18 and/or pipe inlet 26 to be formed.

In alternative assembly methods, the steps may be completed in a different order. For example, the fastener 14 may be located within the housing 12 before positioning a portion of the fuel pipe 13 within the aperture 18 or pipe inlet 26; or the end component 76 may be added to the fuel pipe 13 prior to insertion of the fuel pipe through the aperture 18 and/or pipe inlet 26.

Figure 4:
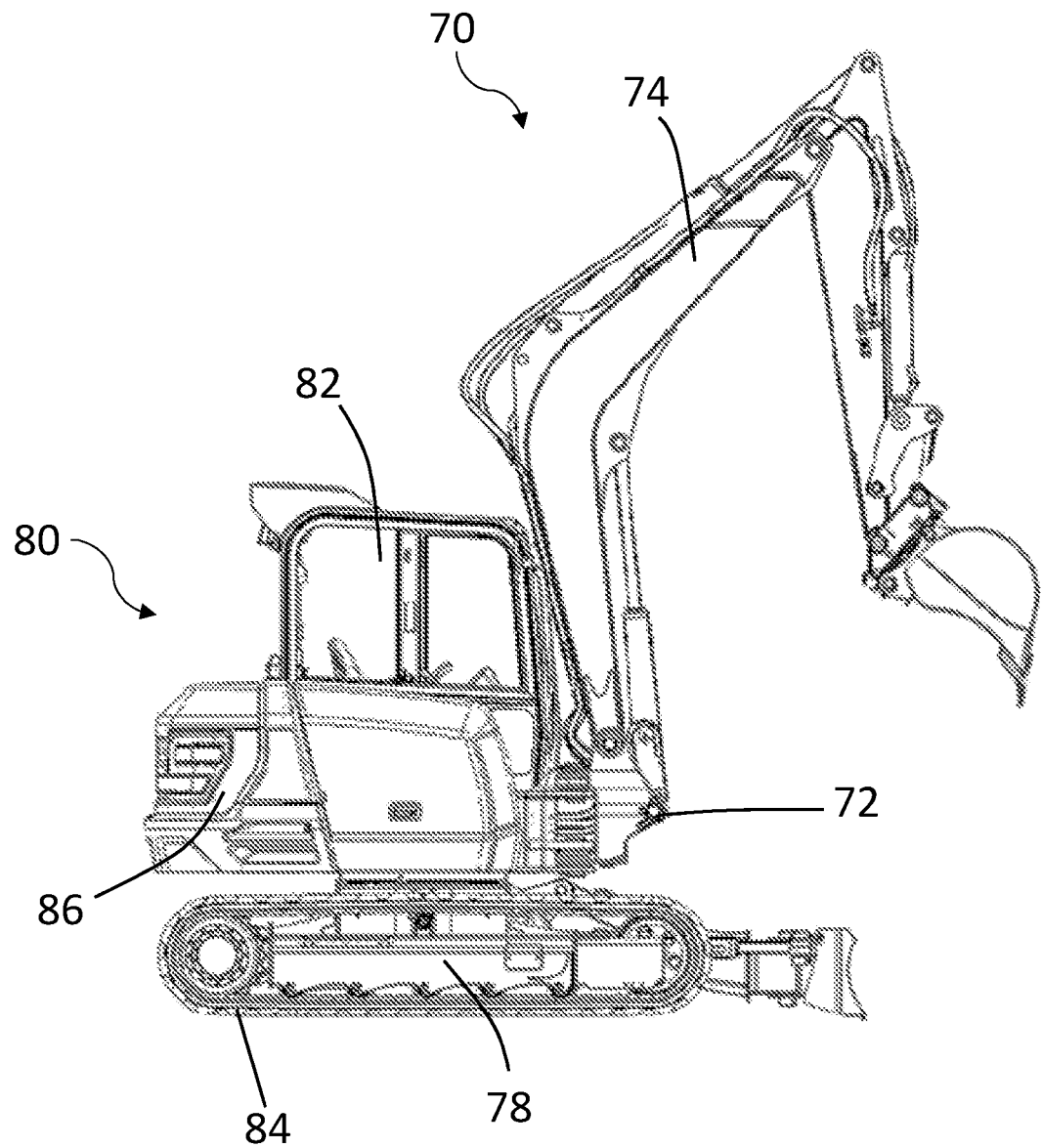
FIG. 4 is a schematic side view of a working machine according to an embodiment.

Referring now to FIG. 4, a working machine is illustrated and is indicated generally at 70. The working machine 70 includes an engine assembly 60 according to FIG. 3 therein.

The working machine 70 includes a body 72 and a working arm 74 connected to the body 72. The working arm 74 is provided on the working machine 70 for carrying out working operations and includes a working implement (not shown) mounted at the distal end thereof.

The working machine 70 includes an undercarriage 78 and a superstructure 80. In the arrangement shown, the superstructure 80 is rotatably mounted on the undercarriage 78, for example via a slew ring. A cab 82 from which an operator can operate the working machine 10 is provided on the superstructure 80.

It will be appreciated that whilst the illustrated working machine 70 is an excavator, the working machine 70 could be any machine including a hydraulically driven or engine mounted fan. Examples of such machines are dumper vehicles, telehandlers, backhoe loaders, cranes, tractors, loading shovels or the like.

The working machine 70 includes a ground engaging structure 84 in the form of tracks. In alternative arrangements the ground engaging structure 84 may be provided in the form of wheels. The working machine 70 includes a drive arrangement for driving the ground engaging structure 84 in order to propelling the working machine 70. The drive arrangement is provided within an engine compartment 86 of the working machine 70. As will be discussed in more detail below, the drive arrangement includes an engine assembly for driving the ground engaging structure (i.e. propelling the working machine 70), and a fan assembly for cooling the engine assembly.

Although the invention has been described in terms of a fastener assembly for an engine of a working machine, it will be appreciated that the fastener assembly is suitable for use in an engine assembly of any vehicle, such as a car, lorry etc.

Although not illustrated, the housing 12 may include one or more projections on an internal face of the end surface 16. The one or more projections may be configured to urge the second seal member 38 into engagement with the pipe 13 to improve the seal created between the support member support and the fuel pipe.

Although not illustrated, the fastener assembly 10 may include a reinforcing member interposed between the fastener 14 and the second support member 38. In such arrangements, the reinforcing member provides support to the second seal member 38 to limit deformation of the second seal member 38 during insertion of the pipe 13.

The invention claimed is:

1. A fastener assembly for connecting a fuel pipe to an engine component, the fastener assembly comprising:
    a housing comprising an end surface having an aperture for receiving a fuel pipe therethrough, in use, and at least one side wall extending from the end surface, wherein a distal end of the at least one side wall defines an open end of the housing and wherein the end surface and the at least one side wall define a recess for receiving a fastener therein; and
    a fastener positioned within the housing, the fastener comprising a pipe inlet for receiving a fuel pipe therethrough, in use, and a connecting arrangement for connecting the fastener to an engine component; and
    wherein the housing comprises a first seal member configured to seal the aperture against an external surface of a fuel pipe extending therethrough, and a second seal member configured to form a second seal with an external surface of a fuel pipe when in use, the second seal member being separate from the first seal member.

2. The fastener assembly according to claim 1, wherein the first seal member is resiliently deformable.

3. The fastener assembly according to claim 1, wherein the first seal member comprises a rib extending radially inwardly from the housing, and wherein, in use, the rib is configured and arranged to be deflected in a direction towards the open end of the housing upon movement of a fuel pipe in a direction towards the open end of the housing and to be deflected in a direction away from the open end of the housing upon movement of a fuel pipe in a direction away from the open end of the housing.

4. The fastener assembly according to claim 1, wherein the housing comprises a radially inwardly extending second seal member angled in a direction away from the open end of the housing, and wherein a radially inner surface of the second seal member is configured for forming the second seal surface, in use.

5. The fastener assembly according to claim 4, wherein the housing comprises one or more projections on an internal face of the end surface configured to urge the second seal member into engagement with the fuel pipe, in use.

6. The fastener assembly according to claim 4, further comprising a reinforcing member interposed between the fastener and the second seal member.

7. A fastener assembly for connecting a fuel pipe to an engine component, the fastener assembly comprising:

a housing comprising an end surface having an aperture for receiving a fuel pipe therethrough, in use, and at least one side wall extending from the end surface, wherein a distal end of the at least one side wall defines an open end of the housing and wherein the end surface and the at least one side wall define a recess for receiving a fastener therein; and a fastener positioned within the housing, the fastener comprising a pipe inlet for receiving a fuel pipe therethrough, in use, and a connecting arrangement for connecting the fastener to an engine component;

wherein the housing is configured to sealingly engage an outer surface of a fuel pipe extending therethrough when in use;

wherein the housing is configured to form a second seal surface with an external surface of a fuel pipe when in use; and wherein the fastener assembly defines an internal cavity, e.g. an annular cavity, for receiving dust therein.

8. The fastener assembly according to claim 7, wherein the internal cavity comprises an inlet positioned between the first and second seal surfaces.

9. A fastener assembly for connecting a fuel pipe to an engine component, the fastener assembly comprising:

a housing comprising an end surface having an aperture for receiving a fuel pipe therethrough, in use, and at least one side wall extending from the end surface, wherein a distal end of the at least one side wall defines an open end of the housing and wherein the end surface and the at least one side wall define a recess for receiving a fastener therein; and a fastener positioned within the housing, the fastener comprising a pipe inlet for receiving a fuel pipe therethrough, in use, and a connecting arrangement for connecting the fastener to an engine component;

wherein the housing is configured to sealingly engage an outer surface of a fuel pipe extending therethrough when in use; and further comprising a support member positioned in the housing recess for supporting the fastener within the housing.

10. The fastener assembly according to claim 9, wherein the support member is configured for forming a second seal surface.

11. The fastener assembly according to claim 9, wherein the support member comprises a radially inner surface configured to conform to a radially outer surface of the fastener.

12. The fastener assembly according to claim 9, wherein the support member is separate from the housing and is retained within the housing, e.g. via an interference fit or frictional mount.

13. A fastener assembly for connecting a fuel pipe to an engine component, the fastener assembly comprising:

a housing comprising an end surface having an aperture for receiving a fuel pipe therethrough, in use, and at least one side wall extending from the end surface, wherein a distal end of the at least one side wall defines an open end of the housing and wherein the end surface and the at least one side wall define a recess for receiving a fastener therein; and a fastener positioned within the housing, the fastener comprising a pipe inlet for receiving a fuel pipe therethrough, in use, and a connecting arrangement for connecting the fastener to an engine component, wherein the housing is configured to sealingly engage an outer surface of a fuel pipe extending therethrough when in use, and wherein the housing is configured to retain the fastener therein.

14. A fastener assembly for connecting a fuel pipe to an engine component, the fastener assembly comprising:

a housing comprising an end surface having an aperture for receiving a fuel pipe therethrough, in use, and at least one side wall extending from the end surface, wherein a distal end of the at least one side wall defines an open end of the housing and wherein the end surface and the at least one side wall define a recess for receiving a fastener therein; and a fastener positioned within the housing, the fastener comprising a pipe inlet for receiving a fuel pipe therethrough, in use, and a connecting arrangement for connecting the fastener to an engine component, wherein the housing is configured to sealingly engage an outer surface of a fuel pipe extending therethrough when in use, wherein the housing is configured to retain the fastener therein; and wherein the housing comprises a plurality of retaining arms extending from the distal end of the at least one side wall for engaging the fastener to retain the fastener within the housing.

15. The fastener assembly according to claim 14, wherein the one or more retaining arms each comprise a projection extending radially inward therefrom to substantially oppose the end surface.

16. A fastener assembly for connecting a fuel pipe to an engine component, the fastener assembly comprising:

a housing comprising an end surface having an aperture for receiving a fuel pipe therethrough, in use, and at least one side wall extending from the end surface, wherein a distal end of the at least one side wall defines an open end of the housing and wherein the end surface and the at least one side wall define a recess for receiving a fastener therein; and a fastener positioned within the housing, the fastener comprising a pipe inlet for receiving a fuel pipe therethrough, in use, and a connecting arrangement for connecting the fastener to an engine component, wherein the housing is configured to sealingly engage an outer surface of a fuel pipe extending therethrough when in use, and wherein a seal member comprises a rib extending radially inwardly from the housing, and wherein, in use, the rib is configured and arranged to be deflected in a direction towards the open end of the housing upon movement of a fuel pipe in a direction towards the open end of the housing and to be deflected in a direction away from the open end of the housing upon movement of a fuel pipe in a direction away from the open end of the housing.

* * * * *